US011204914B2

(12) United States Patent
Royyuru et al.

(10) Patent No.: US 11,204,914 B2
(45) Date of Patent: Dec. 21, 2021

(54) SYSTEMS AND METHODS FOR A FEDERATED DIRECTORY SERVICE

(71) Applicant: First Data Corporation, Coral Springs, FL (US)

(72) Inventors: Vijay K. Royyuru, Norristown, PA (US); Lanny Byers, Ridgefield, CT (US); Cindy White, Hockessin, DE (US); Charles R. Williams, Chamblee, GA (US)

(73) Assignee: FIRST DATA CORPORATION, Brookfield, WI (US)

( * ) Notice: Subject to any disclaimer, the term of this patent is extended or adjusted under 35 U.S.C. 154(b) by 132 days.

(21) Appl. No.: 16/597,532

(22) Filed: Oct. 9, 2019

(65) Prior Publication Data

US 2020/0117656 A1 Apr. 16, 2020

Related U.S. Application Data

(60) Provisional application No. 62/743,987, filed on Oct. 10, 2018.

(51) Int. Cl.
*G06F 16/00* (2019.01)
*G06F 16/23* (2019.01)
*G06F 16/25* (2019.01)
*G06F 16/27* (2019.01)

(52) U.S. Cl.
CPC ........ *G06F 16/2379* (2019.01); *G06F 16/256* (2019.01); *G06F 16/27* (2019.01)

(58) Field of Classification Search
CPC ..... G06F 16/2379; G06F 16/27; G06F 16/256
See application file for complete search history.

(56) References Cited

U.S. PATENT DOCUMENTS

| 2015/0324178 A1 | 11/2015 | Arnold et al. |
| 2017/0132630 A1 | 5/2017 | Castinado et al. |
| 2017/0243212 A1* | 8/2017 | Castinado ............. H04L 9/3236 |

(Continued)

FOREIGN PATENT DOCUMENTS

| CA | 3026255 A1 | 2/2018 |
| CA | 3039259 A1 | 5/2018 |

*Primary Examiner* — Khanh B Pham
(74) *Attorney, Agent, or Firm* — Foley & Lardner LLP

(57) ABSTRACT

Systems and methods are provided for a decentralized distributed ledger that hosts a directory service for customer aliases to facilitate obtaining customer account details. Aspects of the present disclosure may include receiving a request to execute a transaction, wherein the request includes identification information associated with a particular user, transmitting a communication to the database of the existing distributed ledger, wherein the second communication includes a request for an identity of a contributing entity that previously contributed user data associated with the particular user to the database, and wherein the request for the identity of the contributing entity includes an alias associated with the particular user, receiving the identity of the contributing entity, executing a request for account information for the particular user from the contributing entity, wherein the request for account information is transmitted to the contributing entity, receiving account information associated with the particular user, and executing the transaction using the account information.

21 Claims, 10 Drawing Sheets

(56) References Cited

U.S. PATENT DOCUMENTS

| | | |
|---|---|---|
| 2017/0243217 A1* | 8/2017 | Johnsrud ............ G06Q 20/4014 |
| 2018/0060868 A1 | 3/2018 | Mattes et al. |
| 2018/0182000 A1 | 6/2018 | Cook et al. |
| 2018/0198631 A1 | 7/2018 | Yang |
| 2018/0232817 A1 | 8/2018 | Isaacson et al. |
| 2018/0293556 A1* | 10/2018 | Hyun ................ G06Q 20/4014 |

* cited by examiner

Blockchain State Database Data Model

Certificate Authority

| Element | Description |
|---|---|
| CA URL | URL of Root Certificate of Certificate Authority; Unique |
| CA Name | Name of Certificate Authority |

Entity

| Element | Description |
|---|---|
| Entity ID | Identifier of business entity that contributes to or looks up from Directory Service; Unique |
| Entity Name | Name of entity, may be used while obtaining consumer consent for changing global default |
| Public Key Certificate | Certificate with public key of entity, used for mutual authentication in Lookup API; Entity ID as CN; Signed by a trusted CA, so Directory Service has to also keep a list of trusted Root CAs |
| Contribute Permission? | Does this entity have permission to contribute to CA, Phone, Email? |
| API Endpoint | URL Endpoint for Directory Service APIs served by this Entity; Required for Contribute Permission: Y |

| Phone | |
|---|---|
| Element | Description |
| Phone Number | Phone Number that can be looked up to retrieve the Entity ID of entity that can serve the Lookup API; Duplicates allowed for Phone Number + Global Default: N; Indexed |
| Entity ID | Entity that can serve the Lookup API for this phone number; Uniqueness required for Phone Number + Entity ID |
| Global Default? | Has the customer chosen their account at this entity, as their global default account for phone number lookups?; Uniqueness required for Phone Number + Global Default: Y |

404

| Email | |
|---|---|
| Element | Description |
| Email | Email that can be looked up to retrieve the Entity ID of entity that can serve the Lookup API; Duplicates allowed for Email + Global Default: N; Indexed |
| Entity ID | Entity that can serve the Lookup API for this Email; Uniqueness required for Email + Entity ID |
| Global Default? | Has the customer chosen their account at this entity, as their default account for Email lookups?; Uniqueness required for Email + Global Default: Y |

405

| Distributed Ledger Transaction Operations | |
|---|---|
| Operation | Description |
| Create | Insert |
| Delete | |
| Resolve | Operate on Phone and Email tables to change Global Default?. Include a Transaction ID reference to the Requesting Entity's internal Audit Log where proof of customer consent for changing Global Default is recorded |

FIG. 4B

SYSTEMS AND METHODS FOR A FEDERATED DIRECTORY SERVICE

CROSS-REFERENCES TO RELATED APPLICATIONS

This application claims the benefit of priority to U.S. Provisional Patent Application No. 62/743,987, filed Oct. 10, 2018, entitled "SYSTEMS AND METHODS FOR A FEDERATED DIRECTORY SERVICE," the contents of which are herein incorporated in their entirety.

BRIEF SUMMARY OF THE INVENTION

Systems and methods are provided for a decentralized distributed ledger that hosts a directory service for customer aliases to facilitate obtaining customer account details. Embodiments of the present technology may include a system comprising one or more processors and a memory having instructions stored thereon. When executed by the one or more processors, the instructions may cause the computing device to perform operations including identifying user data including identification information and account information associated with each user of a group of users, wherein the identification information includes an alias for each user of the group of users. The operations may further include generating one or more entries for an existing database in an existing distributed ledger using identification information for the requesting entity and aliases associated with users of the group of users, wherein the existing database in an existing distributed ledger includes user data contributed by other devices on the network. The operations may further include transmitting the one or more entries for writing into the existing distributed ledger. The operations may further include receiving a communication including confirmation that the one or more entries were validated by other devices on the network. The operations may further include receiving a request to execute a transaction, wherein the request includes identification information associated with a particular user. The operations may further include transmitting a communication to the database of the existing distributed ledger, wherein the second communication includes a request for an identity of a contributing entity that previously contributed user data associated with the particular user to the database, and wherein the request for the identity of the contributing entity includes an alias associated with the particular user. The operations may further include receiving the identity of the contributing entity. The operations may further include executing a request for account information for the particular user from the contributing entity, wherein the request for account information is transmitted to the contributing entity. The operations may further include receiving account information associated with the particular user. The operations may further include executing the transaction using the account information. These operations may be performed, for example, by the network device of the requesting entity.

Additional operations may further include, for example, receiving a first communication including a request for user data associated with a group of users, receiving user data including identification information and account information associated with each user of a group of users, and filtering the user data to exclude the account information associated with the group of users. In an additional aspect of embodiments, the received account information is received in the form of a token, wherein the token is an encrypted version of account information for a user of the group of users. In an additional aspect of embodiments executing a request for account information includes transmitting a third communication including a request for account information for the particular user, wherein the request for account information includes identification information associated with the particular user. In an additional aspect of embodiments, validation of the one or more entries by another device on the network may further include receiving the one or more entries for the existing database, retrieving a previous hash associated with a previous entry in the existing database, generating a new hash using a hash algorithm using data incorporated into the one or more entries, and comparing the new hash with the previous hash. In an additional aspect of embodiments, transmitting the one or more entries for writing into the database of the existing distributed ledger further includes executing a create function to add the one or more entries to the director. Additional operations may further include determining that the requesting entity is no longer a trusted node in the network, and executing a delete function to delete the one or more entries from the database of the existing distributed ledger. In an additional aspect of embodiments, receiving the identity of the contributing entity further comprises receiving a URL associated with the contributing entity and a lookup API associated with the contributing entity, wherein the request for account information is transmitted to the contributing entity and is executed using the lookup API at the URL associated with the contributing entity.

The above described operations may be implemented as a computer-program product. For example, a computer-program product may be tangibly embodied in a non-transitory machine-readable storage medium, including instructions configured to cause a data processing apparatus to perform the operations. The above described operations may be implemented as one or more methods.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 4A and 4B illustrate logical data models including data tables that may be stored at each node in a computer network system, according to embodiments of the present technology.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The phrase "write to a block", "writing to a block", and like phrases may be used throughout the disclosure. As used in this disclosure, when a device "writes" data to a block in a distributed ledger it may mean that the device broadcasts (e.g., to share, replicate, synchronize, etc.) the data to one or more components of computer network 100. Subsequently, one or more components of computer network 100 may process the data (along with other data in a block) to produce the block in the distributed ledger (i.e. add the block containing the data to the distributed ledger).

Figure 1:
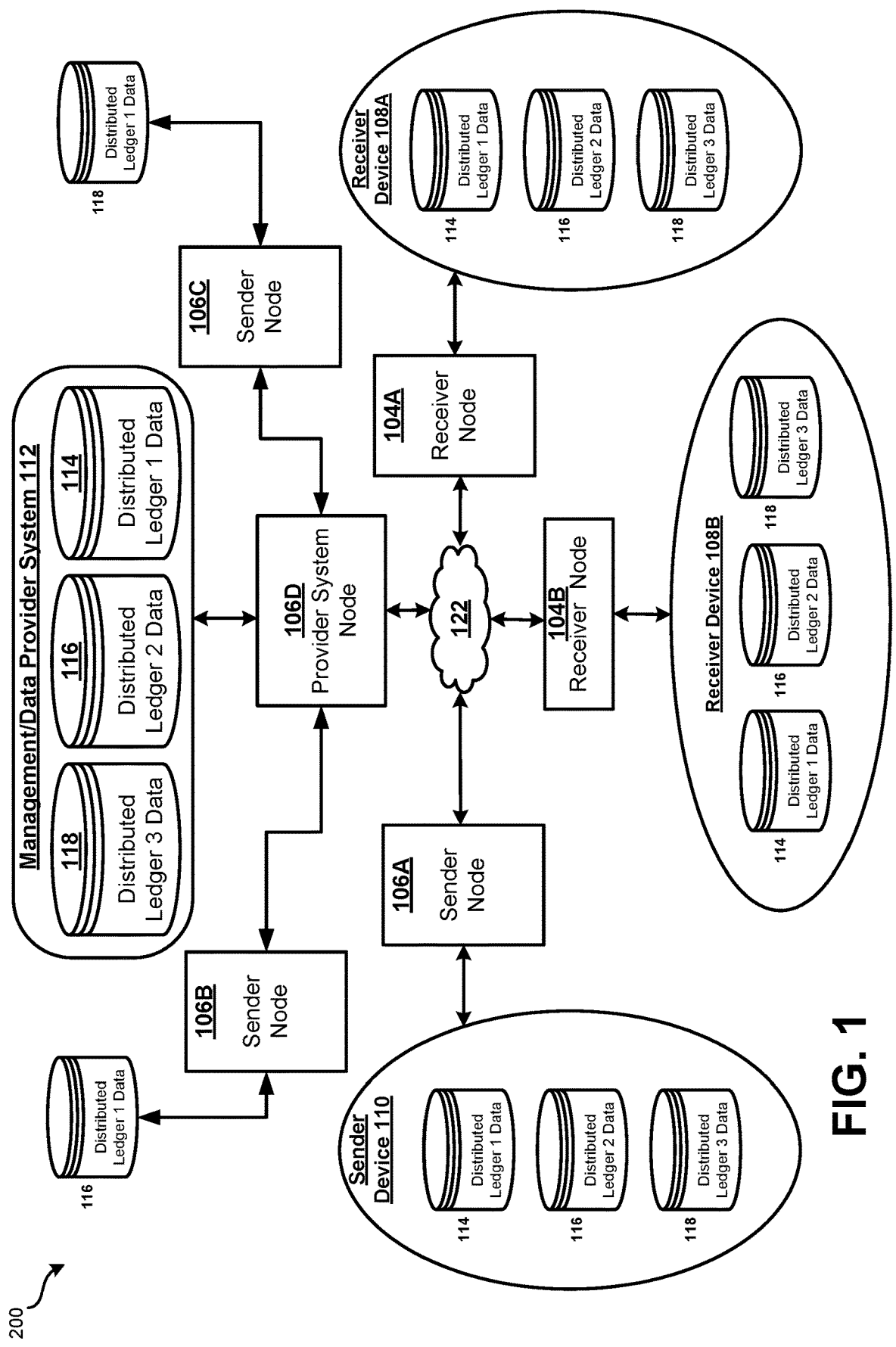
FIG. 1 is a system diagram depicting a system for a decentralized distributed ledger that hosts a directory service, according to embodiments of the present technology.

Systems and methods are provided for a decentralized distributed ledger that hosts a directory service for customer aliases to facilitate obtaining customer account details. FIG. 1 illustrates a schematic illustration of computer network 100. Computer network 100 may facilitate secure data communication between one or more components of computer network 100. The secure data communication may be, for example, immutable. Computer network 100 may implement distributed ledger based technology in one or more embodiments. A distributed ledger, such as a blockchain, may include digital data that is spread across multiple sites (e.g., nodes) in the computer network 100. The spread data may be replicated and synchronized between the different sites. For example, a distributed ledger may include a chain of blocks that are cryptographically interlocked. For example, a first block in a distributed ledger may comprise a first plurality of data. This data may be then cryptographically hashed, for example, by an algorithm. For example, the algorithm may be a Secure Hash Algorithm-256 bit (SHA-256), to form a first block hash. A second block may comprise a second plurality of data and the first block hash. The second block may be then cryptographically hashed to form a second block hash. The second block hash may be used as an input into a third block and so forth. By using the previous block's hash as an input into the current block, the blocks in a distributed ledger are cryptographically interlocked. This cryptographic interlocking may create an immutable data chain because a change in a prior block would modify the hash of that prior block and subsequent blocks. As a result, a change in a prior block of a distributed ledger may be easily detected.

As noted, computer network 100 may implement a decentralized ledger, such as using blockchain technology. Use of a decentralized ledger allows multiple parties to transfer and store sensitive information in a space that is secure, permanent, pseudoanonymous, and easily accessible. This simplifies paper-heavy, expensive, and/or logistically complicated systems. The ledger is amended without input or approval from a controlling entity. Entire networks, in the form of networked devices/nodes determine the validity of data within the ledger. This eliminates the need for a third-party or other intermediary to monitor and verify the information, such as rates and requests. If anyone attempts to tamper with a ledger entry, the rest of the network will disagree on the integrity of that entry and will not incorporate the entry.

In an embodiment, the distributed ledger may be used host user data associated with one or more entities, such as one or more financial institutions. The distributed ledger may be used as a master or global database of user data so that one or more requesting entities may obtain contact information for a user and/or an entity that is associated with the user (e.g., at which the user has a bank or other account), and ultimately account information for that user. For example, computer network 100 may be used to collect user data, including but not limited to identification information and account information associated with users, from one or more contributing entities. The contributing entities may contribute data associated with their users or clients for the good of the system, which the contributing entities may also use for themselves, so that other entities also contribute data associated with their users or clients, creating a master or global database of such data. For example, a contributing entity may contribute specific identification information associated with their users, such as an email address and/or phone number. The identification information may also be described as an alias because the identification information acts as an alias for the associated user's real name, account information, etc. The identification information may be associated with user account information (e.g., account number, routing number, etc.), but that user account information may not be provided to the distributed ledger for the privacy of the user. Instead, the identification information may be associated with the contributing entity itself when provided to the distributed ledger. When another entity requests information associated with a particular user, such as if the requesting entity has identification information associated with the user, the requesting entity may obtain an identification of the contributing entity associated with the user. The requesting entity may then contact the contributing entity to obtain additional information (e.g., account information) associated with the user.

Computer network 100 comprises a receiver device 108A, a receiver device 108B, a sender device 110, a management system 112, and networks 122. Although, only two receiver devices are shown in the illustrated embodiment of computer system 100, a plurality of receiver devices (e.g. 100, 50, etc.) may be implemented in computer system 100. Similarly, although, only one sender device is shown in the illustrated embodiment of computer system 100, a plurality of sender devices (e.g. 100, 50, etc.) may be implemented in computer system 100.

Computer network 100 may also include a decentralized application (not shown). The decentralized application may be an application that partly or fully exists in a plurality of devices (e.g., sender device 110, receiver device 108A, receiver device 108B, and management system 112) via a distributed ledger. In an embodiment, the decentralized application comprises one or more sender nodes 106 (e.g., sender nodes 106A-D as shown as an example in FIG. 1), receiver node 104A and receiver node 104B. Sender node(s)

106, receiver node 104A, and receiver node 104B may each be implemented as a computerized protocol that may, based upon one or more conditions, facilitate, manage, verify and/or control one or more transactions associated with the decentralized application. In one embodiment, sender node(s) 106, receiver node 104A and receiver node 104B may be written into one or more entries (e.g. blocks) in a distributed ledger. For example, management system 112 may write the computerized protocol that defines sender node(s) 106, receiver node 104A, and receiver node 104B into a first block of a distributed ledger. The first block may be then processed by one or more components of computer network 100 and added to the distributed ledger. A subsequent block in the distributed ledger may use the hash of the first block as an input. The cryptographic interlocking process may permanently add the computerized protocols that define sender node(s) 106, receiver node 104A, and receiver node 104B into a distributed ledger. By putting sender node(s) 106, receiver node 104A, and receiver node 104B onto a distributed ledger, the protocols defining each node may be immutable. In one embodiment, sender node(s) 106, receiver node 104A, and receiver node 104B may be written into different blocks of a distributed ledger. For example, sender node(s) 106 may be written to a first block of a distributed ledger, receiver node 104A may be written to a second block in the distributed ledger, and receiver node 104B may be written to a third block in the distributed ledger. In one embodiment, receiver node 104A and receiver node 104B may be a single node.

Sender device 110, which may otherwise be known as a contributing device 110, may be computerized user or client devices. Sender device 110 may be implemented as a computer, cellular phone, mobile phone, smart phone, desktop computer, mobile computer, computer server, and the like. Sender device 110 may be associated with a contributing entity that wants to transmit user data to the system. For example, sender device 110 may transmit user data, such as user identification data, user account information, etc. to a distributed ledger. In another embodiment, sender device 110 may generate a block for the distributed ledger, where the block includes such user data. Sender device 110 may communicate with sender node(s) 106 via networks 122. Sender device 110 may also store and execute one or more parts of distributed ledger data 114.

Additionally, some or all of the data received by the receiver devices and/or appended to the ledger may be digitally signed, such as by the sending party digitally signing the data with the sending party's own private key. Once signed, parties to the computer network or data provider system that have corresponding public keys may view and validate the information. By signing data with the private key, any party having the corresponding public key may be assured that the data originated from the particular signing party. Oftentimes, digitally signed data will be provided to the provisioning system and/or other parties along with the public key associated with the signing party. This public key may be used by each party to verify the origination of the data. For example, this process of signing and validating may be included within a permission-based distributed ledger.

Receiver devices 108A and 108B may be computerized user or client devices. Receiver devices 108A and 108B may be implemented as computers, cellular phones, mobile phones, smart phones, desktop computers, mobile computers, computer servers, and the like. Receiver devices 108A and 108B may also be individuals, merchants, and/or other entities. In some embodiments, the sender devices or entities (and/or receiver devices or entities) may be operated by financial providers, such as international banks, dynamic currency conversion providers, and/or other currency exchanging entity. Receiver devices 108A and 108B may communicate with one or more receiver nodes via networks 122. Receiver devices 108A and 108B may also store distributed ledger data 114. Distributed ledger data 114 may be data associated with a distributed ledger and the distributed ledger may be initialized in response to the creation of a distributed ledger by sender node(s) 106. Distributed ledger data 114 may include one or more datasets associated with the distributed ledger. For example, distributed ledger data 114 may include one or more blocks that make up the distributed ledger. In such an example, distributed ledger data 114 may include one or more parts of a decentralized application.

In another example, distributed ledger data 114 may include block validator parameters. Block validator parameters may indicate various conditions for producing a block for a distributed ledger. The block validator parameters may be based on a block validator algorithm. For example, a block validator parameter may indicate that a particular cryptographic puzzle must be solved prior to adding a block to the distributed ledger. In some embodiments, solving a cryptographic puzzle may be implemented by a proof-of-work consensus algorithm. In another example, block validator parameters may indicate a round-robin algorithm that indicates a particular device that is authorized to produce a block for the distributed ledger within a certain period of time. While it may be possible to use such cryptographic puzzles or other proof-of-work consensus algorithms, the system may also not include such an aspect of the system. For example, the system may be a permission-based ledger.

By storing distributed ledger data 114 across a plurality of devices or a plurality of nodes associated with those devices (where each of the nodes and/or devices may be controlled by one or more entities), the distributed ledger may be decentralized because a plurality of devices may contribute to the distributed ledger and detect if there is an authorized change to the distributed ledger. By distributing distributed ledger data 114 to a plurality of devices no single point of attack exists for potential malicious actors, which makes the distributed ledger more secure. The simultaneous possession of the dynamically updated ledger ensures transparency of the information contained therein so as to provide an assurance of validity to all entities accessing the data, thus eliminating the need for a single trusted intermediary. The ledger may include data related to some or all previous requests and/or blocks.

Receiver devices 108A and 108B may also execute one or more computerized protocols in the distributed ledger. For example, a decentralized application may be executed by one or more blocks in the distributed ledger. Whenever one or more functions of the decentralized application is utilized, a device (e.g., receiver devices 108A, receiver device 108B, sender device 110, management system 112) holding the decentralized application may execute the protocol.

Management system 112 may comprise a computerized server or database that manages one or more aspects of computer network 100. For example, management system 112 may serve as an aggregator that allows sender (i.e., contributors) to contribute to the distributed ledger. For example, management system 112 may allow this without requiring a sender or contributor to connect directly to the distributed ledger system. It should be understood that a different structure, such as one that does not include a management/data provider system or gateway, may also allow for senders to contribute data. In the example shown in FIG. 1, node 106A may contribute ledger data 114, node 106B may contribute ledger data 118 via provider system node 106D, and node 106C may contribute ledger data 116 via 106D. All nodes that connect directly to the network 122, i.e. 106A, 106D, 104A, 104B, may host a copy of the same data sets, 114, 116, 118.

As shown in FIG. 1, the system may include sender and receiver node(s). An example sender node may include a node that connects the management/data provider system 112 to the network 122, i.e. provider system node 106D. Provider system node 106D may operate as a sender node similar to sender nodes 106A, 106B, and 106C, but is an interim node between the network 122 and either the data provider system 112 or other nodes. For example, provider system node 106D may be an interim node between network 122 and other sender nodes, such as sender node 106B and 106C, each of which facilitate a ledger data set being contributed to the distributed ledger (such as, for example, distributed ledger data 116 and 118, respectively).

In one embodiment, management system 112 may receive a request associated with sender device 110 to create a distributed ledger. Management system 112 may generate one or more parts or all of a decentralized application based on the request. In one embodiment, in order to generate one or more parts of the decentralized application, management system 112 may write, to a first block in a distributed ledger, one or more parts of the decentralized application (e.g., sender nodes 106A-106D and receiver nodes 104A-104B). This first block may be processed by management system 112 or another device in computer network 100. Management system 112 may transmit to sender node(s) 106A-D of the decentralized application, one or more token parameters. Sender node(s) 106A-D may then initialize the distributed ledger according to the token parameters. For example, the token parameters may indicate to sender node(s) 106A-D to create authentication tokens. This initial creation of the authentication tokens may be included in a block within the distributed ledger which may be indicated in an entry in the distributed ledger.

In one embodiment, management system 112 may act as a trusted party for a distributed ledger. Management system 112 may write one or more data sets into a block that may be used by sender node(s) 106A-D to verify one or more conditions (e.g. allocation conditions). Treating management system 112 as a trusted party may reduce the cost of the distributed ledger. Allowing a trusted party to retrieve and/or verify data and subsequently write the data into a block in the distributed ledger may reduce transaction costs associated with the distributed ledger.

In some embodiments, management system 112 may store several distributed ledger data sets (e.g., distributed ledger data 118, distributed ledger data 116, and distributed ledger data 114) that each may correspond to a different contributing entity. As a result, management system 112 may create and help maintain several different data sets from contributing entities. After a set of data is approved for inclusion in the distributed ledger system, devices in the system, such as management/data provider 112 may share the distributed ledger data with the other devices in the system so that each device/node may include each ledger data set in the ledger.

Network(s) 122 may include any network that supports communications within computer network 100. In one embodiment, networks 122 may be implemented by the Internet, a wide area network (WAN), a local area network (LAN), 3G mobile network, 4G mobile network, 5G mobile network, fiber optic network, Wi-Fi, ZigBee, Bluetooth™, Bluetooth™ Low Energy, and/or other private or public wired and/or wireless networks, or other backbone communication system. In one embodiment, networks 122 may include multiple distinct networks. For example, a network between sender device 110 and a decentralized application may be different from a network between receiver device 108A and the decentralized application. It will be appreciated that one or more different network connections may be used in accordance with the invention, and that the use of a single network 122 to enable communications is merely one example of such configurations. For example, each component may be communicatively coupled with other components using a separate network for one or more of the connections.

Figure 2:
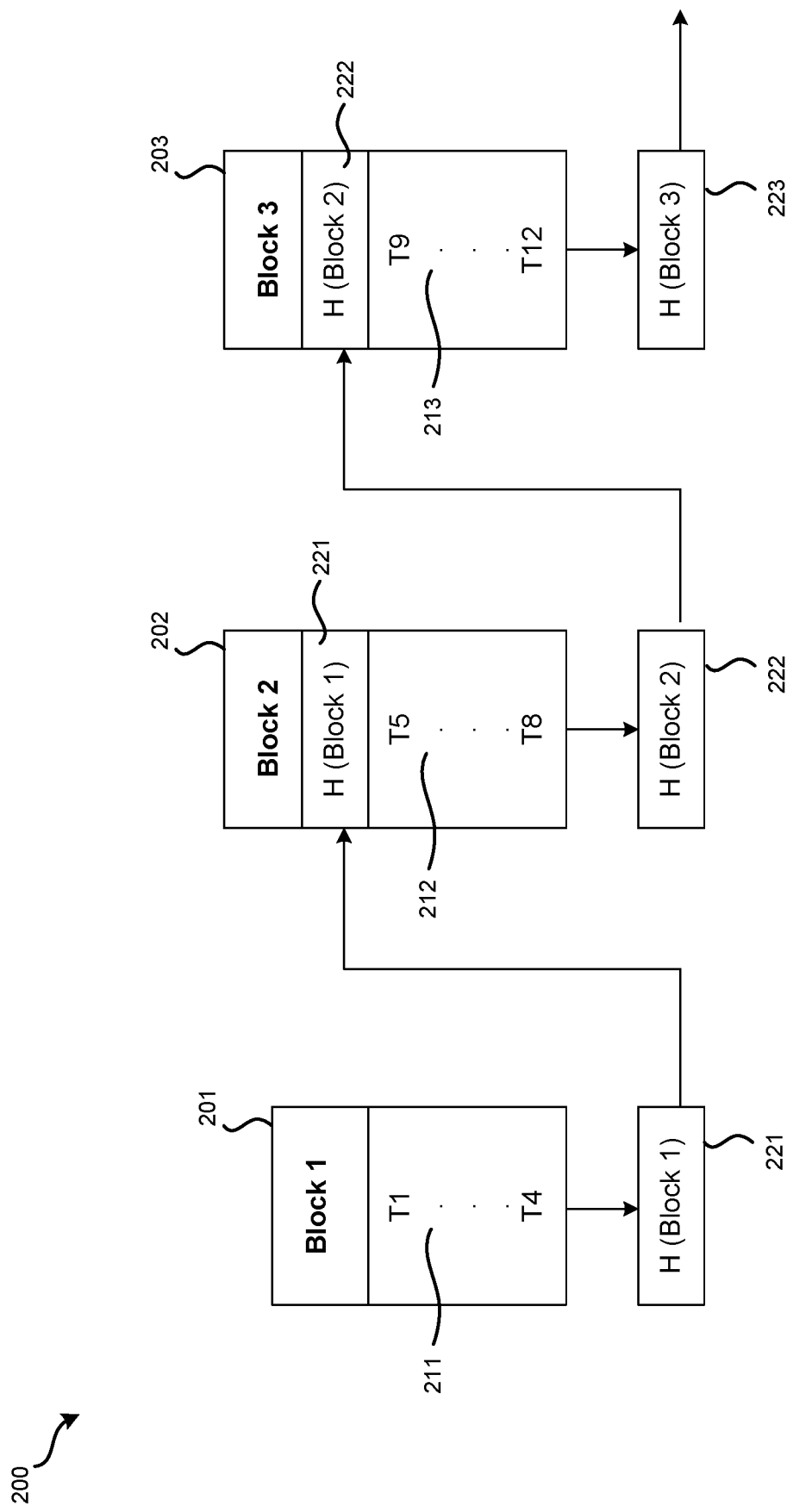
FIG. 2 is a block flowchart representing a system for a decentralized distributed ledger that hosts a directory service, according to embodiments of the present technology.

FIG. 2 illustrates an example distributed ledger 200 with multiple blocks, according to embodiments of the present technology. As noted, computer network 100 may implement distributed ledger-based technology in one or more embodiments. A distributed ledger, such as a blockchain, may include digital data that is spread across multiple sites (e.g., nodes) in the computer network 100. For example, a distributed ledger may include a chain of blocks that are cryptographically interlocked. For example, a first block 201 in a distributed ledger may comprise a first plurality of data, such as a plurality of transactions 211. This data may be then cryptographically hashed, for example, by Secure Hash Algorithm-256 bit (SHA-256), to form a first block hash 221. A second block 202 may comprise a second plurality of data, such as a plurality of transactions 212, and the first block hash 221. The second block 202 may be then cryptographically hashed to form a second block hash 222. The second block hash 222 may be used as an input into a third block 203, which may include a plurality of data such as a plurality of transactions 213 that is cryptographically hashed to generate a third block hash 223, and so forth. By using the previous block's hash as an input into the current block, the blocks in a distributed ledger are cryptographically interlocked. This cryptographic interlocking may create an immutable data chain because a change in a prior block would modify the hash of that prior block and subsequent blocks. As a result, a change in a prior block of a distributed ledger may be easily detected.

As noted herein, blocks 1, 2, and 3 may include data associated with users or clients of contributing devices, which may be controlled by contributing entities. The user data may, as a compilation, contribute to a global distributed ledger data base of users across many or all entities such that a requesting entity may obtain information associated with a user of interest to the requesting entity. While a requesting entity may not be able to obtain account information using the distributed ledger, the requesting entity may obtain other information associated with the user using an alias for the user, such as an email address or telephone number. For example, the requesting entity may obtain identification information and/or contact information for the contributing entity or device that contributed the user's information to the distributed ledger. The functions of the distributed ledger will be described further with respect to FIG. 3.

Figure 3:
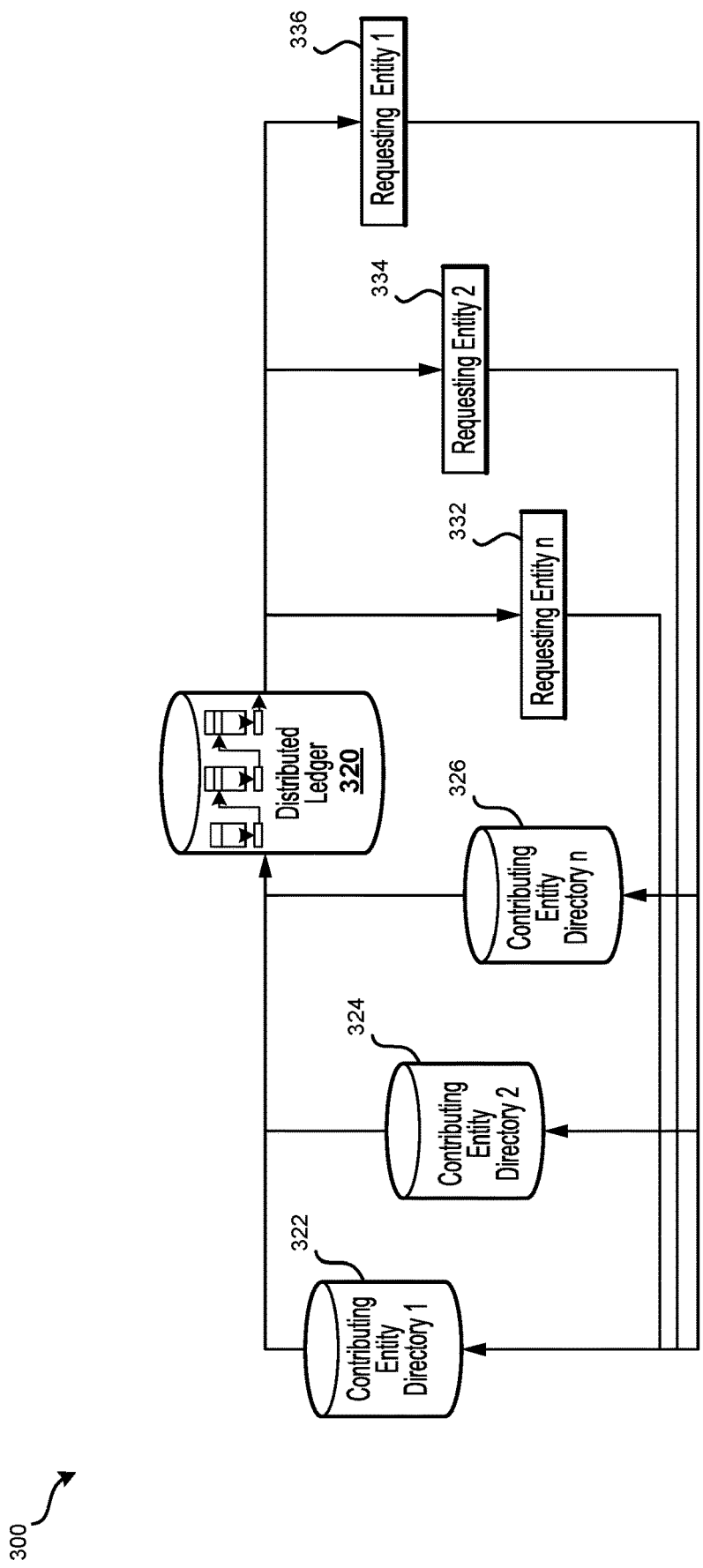
FIG. 3 illustrates a block diagram showing a system including a distributed ledger in a computer network, according to embodiments of the present technology.

FIG. 3 illustrates a block diagram showing a system 300 including a distributed ledger 320 in a computer network, according to embodiments of the present technology. Distributed ledger 320 may take on a variety of different formats. For example, distributed ledger 320 may include a framework similar to Hyperledger Fabric, such that it may be a permissioned infrastructure with both an indexed state database and a transactional ledger. The indexed state database may include user data, data associated with users, clients, or customers, associated with contributing entities that contribute user data to the distributed ledger 320. In other words, the database may include a snapshot of the compilation of the data contributed to the distributed ledger a particular point in time. The transactional ledger may include a historical trace of the one or more transactions that led to that snapshot of data, or that led to the data being changed (e.g., another block being added to the distributed ledger). For example, the transactional ledger may include data associated with transactions for data in the indexed state database.

As noted, the state database is a reflection of the collected user data at any given point in time, and the transactional ledger is a ledger or a historical trace of the events that led to the data being changed over time. The transactional ledger may also be mined or validated by the other parties, or nodes, in the system. For example, contributing and requesting entities may work to validate a block or set of entries in the ledger after one is uploaded to the chain. Once a block is written it is signed, the signature and hash may be reviewed and approved by the other nodes in the system (i.e., the nodes other than the node that wrote the block). For the system to validate a block, in an embodiment, over fifty percent of the other nodes must approve of or validate the block. Other percentages or examples are also possible. Once a block is validated, then that block is considered committed and the nodes begin to trust it as part of the distributed ledger system. To validate the block, a node may verify that the data and hash they have is the same as that data and new hash in the new block.

A new set of data, such as that included in a new block written by a contributing entity, may be validated using the hashes of the new block and the previous block. For example, when a new block is written and sent to the distributed ledger for validation, a node may use the data from the new block and the hash from the previous block to determine a hash for the new block. As described with respect to FIG. 2, a hash from one block is used as part of the following block. In other words, since a hash for a given block is an alias or token that represents all of the data in previous blocks to the current block, a block includes all of the data from blocks before it via the hash. Furthermore, after a block is validated, it is shared across the system so that each node in the system can update their database and ledger with the new block. Therefore, if a node in the system generates a new hash for a current block using the hash from the block directly previous to the current block and the new data from the current block, the new hash should match the hash that it received in the new block. Generating the new hash and comparing it to the hash received as part of the new block allows that node to confirm that the new block only contains new data to be added to the database, and that the previous blocks were not altered. After all, once a block is included in the distributed ledger, it is not supposed to change over time. Validation from the various nodes in the system can confirm that this is the case. After a node tries to validate a new block, the node may "vote" on the new block to indicate to the system whether the node believes that the block can be trusted or not trusted (e.g., if the block is accurate based on comparison of its generated hash for the new block and the hash received with the new block). Based on the votes from the various nodes in the system, the block may be deemed worthy of trust by the group and appended to the end of the chain, or it may be refused and discarded.

A block may also contain a signature. This signature may be generated using the block's transaction ledger contents and a private key associated with the contributing entity that contributed the data in the block. The hash and signature may be validated by the other nodes in the system (e.g., receiving or requesting nodes) before they validate the new block and commit those transactions from that block to their local copies of the state database. The signature may be validated by using the transaction ledger contents in the block and the contributing entity's public key certificate from the entity state table.

Once a block is written, uploaded to the system, and then validated by the other nodes in the system, the block may be shared with each of the other nodes in the system so that those nodes may update their local database and ledger accordingly. In other words, the other nodes may update their database to include the new data that was contributed to the system, and the other nodes may update their ledger to indicate that the transaction of adding the data and validating it. After their local copies are updated, their state database and ledger are updated with the most up-to-date information and data from the system, which may be shared across all nodes in the system. For that reason all nodes (or a subset of nodes) in the system may share the same database and ledger over time. In an embodiment, certain nodes may be restricted from updating their local copies, for example if that node is deemed to be untrustworthy. Restricting the node's access to updates may be an interim step before removing the node's permissions completely or removing it from the system.

System 300 may also include one or more contributing entities, such as contributing entities 322, 324, an 326. It should be understood that even though three contributing entities are shown in system 300, system 300 may include fewer or more contributing entities. Contributing entities 322-326 may contribute user information to the distributed ledger 320. For example, the contributing entities may contribute user information associated with user accounts, such as aliases that represent the user. The aliases may include an email address, telephone number, or other similarly identifying information associated with a user. The contributing entities may also contribute other data that is associated or linked to the user aliases, such as an entity ID. The entity ID may identify the contributing entity itself as the entity that contributed the particular aliases that it contributed. The contributing entities may also contribute the name of the entity itself. The contributing entities may also contribute a global default as chosen by a user, or as assigned to the user based on automatic analysis by the contributing entity or the distributed ledger 320. The contributing entities may also contribute a URL associated with the contributing entity. The URL may be provided as a mechanism for a requesting entity, when aiming to obtain user account information, to contact the contributing entity to obtain that information. After a contributing entity contributes user data to the distributed ledger 320, that user data may be stored in the state database of distributed ledger 320. For example, a contributing entity may upload the user data, including aliases and associated information, via a new block or other type of entry in distributed ledger 320. For example, the data itself may be stored in a state database while the transaction of the contribution itself may be recorded in the transaction ledger.

As noted, distributed ledger 320 may host global user data associated with a variety of contributing entities so that third party entities may use the database to facilitate the third party entities obtaining account information associated with users when the entities are authorized to do so. System 300 may also include one or more requesting entities, such as requesting entities 332, 334, and 336. It should be understood that even though three requesting entities are shown in system 300, system 300 may include fewer or more contributing entities. Requesting entities 322-326 may request user information from the distributed ledger 320.

An example transaction included in the ledger may include "create", which may include a contributing entity adding or contributing user information, including user aliases, to the database. Create may include adding a new block to the database. Another example transaction may include "resolve", which may include a contributing or other entity changing an entry in the database, such as a user's global default (which may be, for example, the only possible change to make given the secure nature of the distributed ledger). Another example transaction included in the ledger may include "delete", which may include removing an entry from the distributed ledger. For example, removing an entry from the distributed ledger may include removing permissions for a contributing entity or a requesting entity. These example types of transactions will be discussed further with respect to FIG. 5.

A global default may be a default account or default contributing entity that hosts an account that the user associated with the account assigns as the user's default account to be used in transactions. For example, a user may have multiple bank or other financial accounts across multiple different entities. The multiple accounts may be associated with the same alias for the user, such as the user's email address or telephone number. Therefore, if a requesting entity obtains an alias for the user and transmits a request to a distributed ledger with the alias to obtain contributing entity information or other associated user account information, the distributed ledger may have a conflict due to multiple different sets of data being available and associated with the alias. More specifically, without an assigned default, the distributed ledger may not know which information to transmit back in response to the requesting entity's request. If the user assigns a global default so as to choose a default account that gets selected by the distributed ledger when such a conflict arises, then such conflicts may be resolved automatically by the distributed ledger. As noted, a "resolve" transaction may take place to change a user's global default. Such an action may be taken if the distributed ledger either does not have a current global default for a user, if the user's global default account is closed or otherwise unavailable, or other situations. To update the user's global default, the distributed ledger or a device associated with the distributed ledger may transmit a communication to the user via the user's telephone or email and ask the user to choose a global default.

Individual entities may also each include local default. A local default may represent a user's choice regarding which account of multiple user accounts may be used as a default as part of a requested transaction within the individual entity. If a user only has one account within an certain entity, then that single account may automatically selected to be the local default account for that entity. On the other hand, if a user has multiple accounts within an entity, then the user may select a default account to be automatically used in a transaction hosted by a requesting entity. In an embodiment, the requesting entity may automatically analyze the user accounts and automatically determine which account should be selected as the user's local default. This analysis and decision may be completed based on different factors, including which account the user uses most often, the number of transactions that occur with the accounts, types of transactions most often used by different accounts, among others. Resolving conflicts, such as multiple accounts associated with the same user at a certain entity, of local defaults may be the responsibility of that individual entity. On the other hand, resolving global conflicts may be the responsibility of the distributed ledger system as a whole. Responsibility may designate which entity or device is responsible for using an application (e.g., software within the devices) to make a determination about which default should be applied. Alternatively, responsibility may designate which entity or device is responsible for contacting the relevant user so that the user may choose which default they would like to implement. In an embodiment, the responsible party may automatically determine a probability or likelihood of a certain default being chosen by the user, or what default should be chosen by the user, and provide that result to the user for confirmation or selection. In an embodiment, the system may transmit the question and/or the results to the user if the probability or likelihood is less than a certain percentage. In addition, the system may determine a confidence percentage that is tethered to the probability or likelihood, and rely on the confidence percentage to determine (e.g., by comparing to a threshold) whether to contact the user to make a final determination regarding the default selection.

Entries or blocks in the indexed state database and distributed ledger 320 may include a variety of different types of data associated with users of the contributing entities. For example, entries in the database may include aliases associated with a specific user of a contributing entity, such as an email address or telephone number. The alias may also be associated with an entity ID, which may be an identification assigned to the particular contributing entity that contributed the associated alias. The different aliases associated with a particular user may, in an embodiment, not be stored in the same database or storage location. This safeguard may help to prevent an untrustworthy entity obtaining two pieces of verifiable information associated with a user so as to allow that entity to try to impersonate or obtain account information for that user.

Requesting entities 322-326 may request user information from the distributed ledger 320. For example, if a requesting entity receives a request from a first user to send money to a second user, the first user may provide its own account information for the requesting entity to remove money from to send the money to the second user. However, the first user may not know the account information for the second user. Instead, the first user may only know an alias of the second user, including an email address or telephone number, and therefore may only provide that alias information to the requesting entity. The requesting entity, knowing that the distributed ledger 320 may contain a database that includes data associated with the second user's alias, may transmit a communication to the distributed ledger 320 with the alias provide by the first user. The distributed ledger 320 may authenticate the requesting entity to confirm that the requesting entity is a trusted entity, and then may respond to the requesting entity's request with user data associated with the alias provided by the requesting user. The response from distributed ledger 320 may include the entity name and/or entity ID for the contributing entity that provided the user data to the distributed ledger. The response may also include a URL associated with the entity, a global default associated with the user in case the user data includes multiple accounts across multiple entities.

After a requesting entity obtains data from distributed ledger 320 in response to its request, such as data associated with the contributing entity, requesting entity may transmit a communication to the contributing entity. The communication to the contributing entity may include a request for account information associated with the user and hosted by the contributing entity. The communication may include the user's alias and other information about the proposed transaction. The requesting entity may also use a lookup API at the entity URL, which it may have received from the distributed ledger 320, to request the account information. After authenticating the requesting entity, the contributing entity may response to the requesting entity's request with the user's account number, routing and transit number, among other information associated with the user or the user's account.

As noted, authentication of other entities on the system may take place in a variety of circumstances. For example, the distributed ledger, such as distributed ledger 320, may authenticate a requesting entity after a requesting entity transmits a communication to the distributed ledger including a request for user identification or account information. The distributed ledger may authenticate the requesting entity to confirm that the requesting entity is a trusted entity and has been authorized to request data from the ledger. For example, the distributed ledger may require that a requesting entity have a client certificate for the client that is making the request. The distributed ledger may transmit a communication to the requesting entity to request that the requesting entity transmit their certificate to the ledger before it will transmit data to the requesting entity. For example, the ledger may use a certificate authority, such as a third party root, to authenticate the requesting entity. In an embodiment, the ledger and requesting entity may complete mutual authentication on each other.

In an embodiment, the requesting entity may generate a public/private key pair. For example, the public/private key pair may include one public key and one private key. The requesting entity may keep the private key to itself as private and not share it with any other entity. The requesting entity may also transmit the public key to a Certificate Authority (CA) for the CA to sign the public key. The CA may be an entity that is trusted by the distributed ledger nodes to generate its public certificate(s). The requesting entity may register this public certificate as its public certificate in the distributed ledger entity table 402.

In an embodiment, after the requesting entity has received user data from the ledger and transmits a communication to the contributing entity associated with the user data to request user account information, the contributing entity may authenticate the requesting entity before transmitting user account information to the requesting entity. The contributing entity may authenticate the requesting entity to confirm that the requesting entity is a trusted entity and has been authorized to request data from the contributing entity. For example, the contributing entity may require that a requesting entity have a client certificate for the client that is making the request. The contributing entity may transmit a communication to the requesting entity to request that the requesting entity transmit their certificate to the contributing entity before it will transmit data to the requesting entity. For example, the contributing entity may use a certificate authority, such as a third party root, to authenticate the requesting entity. In an embodiment, the contributing entity and requesting entity may complete mutual authentication on each other. For example, the parties may use TSL 1 mutual authentication, among other types.

In an embodiment, when the requesting entity sends a Lookup API request to the contributing entity at the contributing entity's URL, a mutual authentication may be performed using the TLS1.2 standard. The requesting entity may authenticate the contributing entity by ensuring that the URL is being served by the contributing entity using a server certificate that is signed by a CA in the distributed ledger. Specifically, this allows requesting entity to trust that it is in fact communicating with the right contributing entity at the URL. Furthermore, each request sent by the requesting entity is signed by the requesting entity using its private key and that signature accompanies the request as per the TLS1.2 standard. The contributing entity may validate that signature by retrieving the requesting entity's public key certificate from the entity table 402 in the distributed ledger system, and using that public key to check the signature. This assures the contributing entity that the request is in fact from the requesting entity. In other words, neither party trusts the other party without checking their signatures. Each party may use their own private key to generate their signature. The other party may use the signing party's public key certificate to validate their signature.

If an entity is authenticated to be a contributing entity and/or a requesting entity, the status of that entity or the relationship of that entity with the system may change over time. For example, permissions granted to the entity may be revocable and may be revoked. As noted, the distributed ledger system may be permission-based. If the entity is later deemed to be unreliable, untrustworthy, or otherwise deemed to be a bad fit for the system, the system may revoke the entity's permissions and/or relationship with the system. In other situations, permissions may be revoked if the entity is performing dictionary attacks on the data, caching data, performing non-audited reverse look-ups, among other examples.

FIGS. 4A and 4B illustrate logical data models including data tables that may be stored at each node in a computer network system such as computer network 100, according to embodiments of the present technology. It should be understood that although the data in the logical data models appear in the figures to be located in tables, the data may be stored in other structures within the state database. The data illustrated in FIGS. 4A and 4B may include the relevant data for this distributed ledger system to work. The five tables in FIGS. 4A and 4B may be stored on each node in the system.

FIG. 4A illustrates a table 401 that includes example entries associated with a certificate authority, according to embodiments of the present technology. The table includes the URL end point for the certificate authority of the root certificate. PKI based certificates have a chain of trust where a root that is trusted by all nodes in the system. A root is a trusted agency that is trusted by the nodes to perform enhanced validation or authentication to confirm that the contributing and requesting entities are who they say they are. The root signs the certificate which is then validated, and in turn trusted by the other nodes because it was signed by the root. As shown in FIG. 4A, the table includes information necessary to identify and contact the certificate authority to verify/authenticate the entities, including the name of the central authority, the URL of the root certificate of the certificate authority, etc.

FIG. 4A also illustrates a table 402 includes example entries associated with an entity, according to embodiments of the present technology. The entity table 402 includes information associated with an entity that participates in distributed ledger system. For example, an entity table may exist within the distributed ledger system for each contributing entity and for each requesting entity. Each entity, as shown in entity table 402, has a name, their own entity ID, and a public key certificate. The public key certificate may be signed or otherwise verified by one of the certificate authorities trusted by the nodes in the system. If an entity obtains a public key certificate that is certified by a certificate authority, then it may be accepted as a node in the system. A contributing entity may also provide a URL for its API and upload that data into the state database so that a requesting entity may obtain the information and contact the contributing entity as facilitated by the system.

FIG. 4B illustrates phone table 403 and email table 404, which may hold data associated with aliases for users of contributing entities, according to embodiments of the present technology. Tables 403 and 404 may include a telephone number and an email address, respectively, for a particular user. The tables, and therefore the user aliases, may be stored on the state database for retrieving by a requesting entity. In these tables, aliases such as a user's telephone number or email address is associated with an entity using the entity's entity ID so that a requesting entity may retrieve that data via a request to the distributed ledger. As noted, in order for the system to work, a user should be identified as unique using the user's email address or phone number plus the entity ID associated with that alias. Additionally, table 405 may include distributed ledger transaction operations. This data represents the different operations that may be executed on the data included in the state database. Each transaction that is executed may be recorded in the transaction ledger so as to track how the data is added, deleted, resolved, etc.

Figure 5:
FIG. 5 illustrates logical data models including data tables that may be stored locally at each node in a computer network system, according to embodiments of the present technology.

FIG. 5 illustrates logical data models including data tables that may be stored locally at each node in a computer network system such as computer network 100, according to embodiments of the present technology. It should be understood that although the data in the logical data models appear in the figures to be located in tables, the data may be stored in other structures. The data illustrated in FIG. 5 may include the relevant data for this distributed ledger system to work, such as for contributing entities to store information about their users. The two tables in FIG. 5 may be stored locally on each node in the system. For example, table 506 includes local directory data models, which may include account numbers, routing and transit numbers, and other information stored with aliases (e.g., email or phone number) for a user account. Local defaults may also be stored here as well. Table 507 includes data associated with a lookup API, which a contributing entity may provide to the transaction ledger so that a requesting entity may connect or communicate with the contributing entity to obtain user account information from the contributing entity.

As noted, contributing entities may replace actual user account information (e.g., account numbers, routing and transit numbers, etc.) with tokens. Tokenization of the sensitive account information may prevent any other entity, such as requesting entities in the system, from knowing the account information of users associated with the contributing entity. For example, when a contributing entity responds to a requesting entity's request for account information associated with a user, the contributing entity may supply a token in place of the account number and other sensitive information. The requesting entity may not see any difference between the token and, for example, the account number. However, when the requesting entity later provides the tokenized account number to the contributing entity, the contributing entity will know the account associated with the token, while any other third party entity would not.

Figure 6:
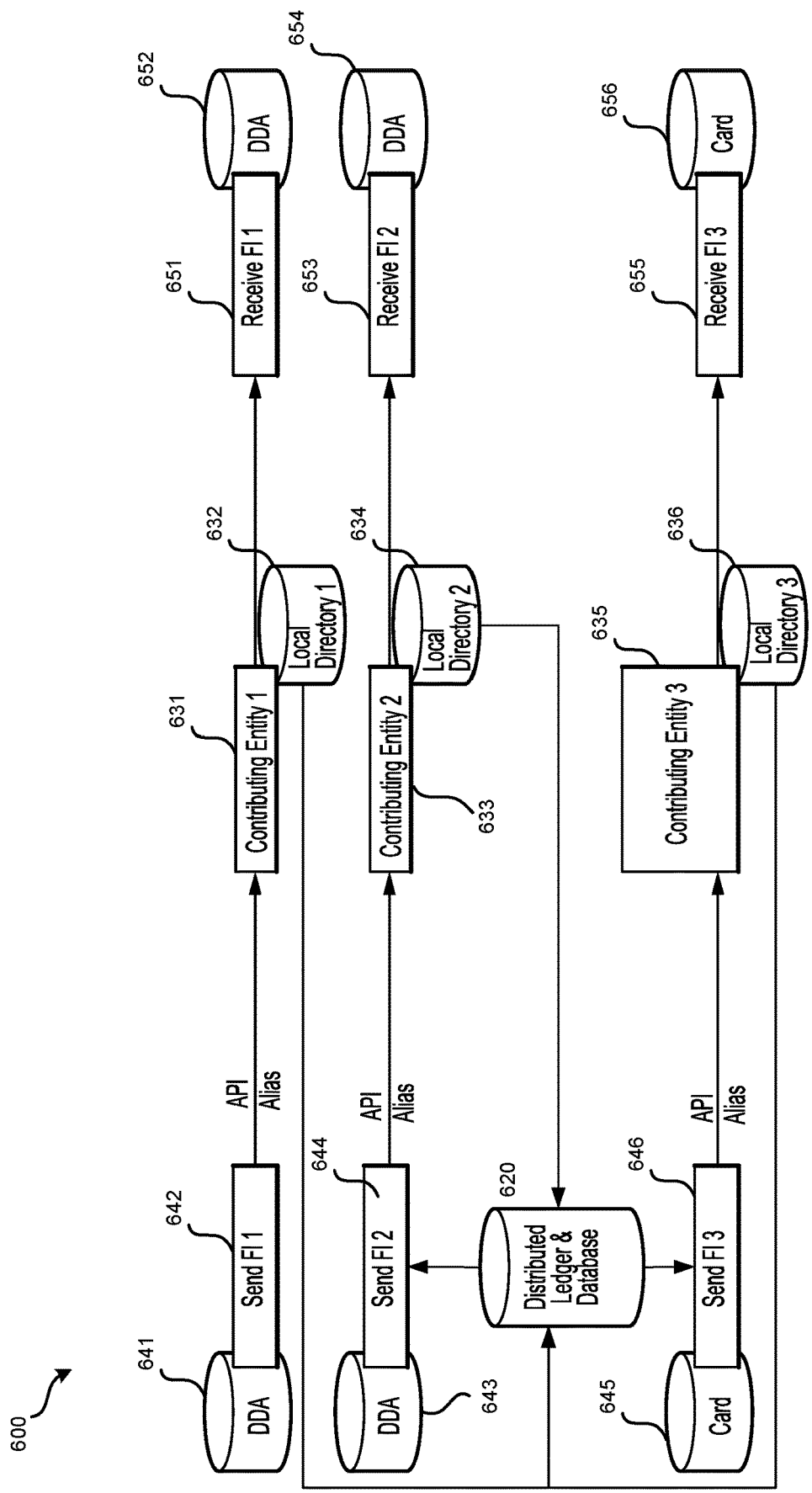
FIG. 6 illustrates an example situation of how embodiments of the present technology may be used in an example transaction.

FIG. 6 illustrates a block diagram 600 of how embodiments of the present technology may be used in an example transaction. As described herein, contributing entities, such as contributing entities 631, 633, and 635, may host individual directories, such as local directories 632, 634, and/or 636, which may include their client, customer, or user information, including aliases, associated with those clients or customers. The contributing entities may contribute that data to a distributed ledger and/or database 620, which may be a central or global host of such user information across a variety or all contributing entities so that all such user information may be accessible to various requesting entities.

In an embodiment, a user may attempt to transmit currency from their demand deposit account (DDA), such as DDA 641, 643, or 645, to another user's DDA, such as DDA 652, 654, or 656. However, the financial institution (FI) that hosts the user's account, such as Send FI 1 642, Send FI 2 644, or Send FI 3 646, may not know the information associated with DDA 652, 654, or 656. Therefore, the Send FI may contact distributed ledger and/or database 620 to obtain contributing entity information associated with the target account to which they intend to send the currency. The Send FI may then transmit a request to the contributing entity retrieved from distributed ledger and/or database 620 including an alias for the target DDA or the user associated with the target DDA. After authentication is completed, the contributing entity may then facilitate the transfer of currency to the target DDA for the target user.

Figure 7A:
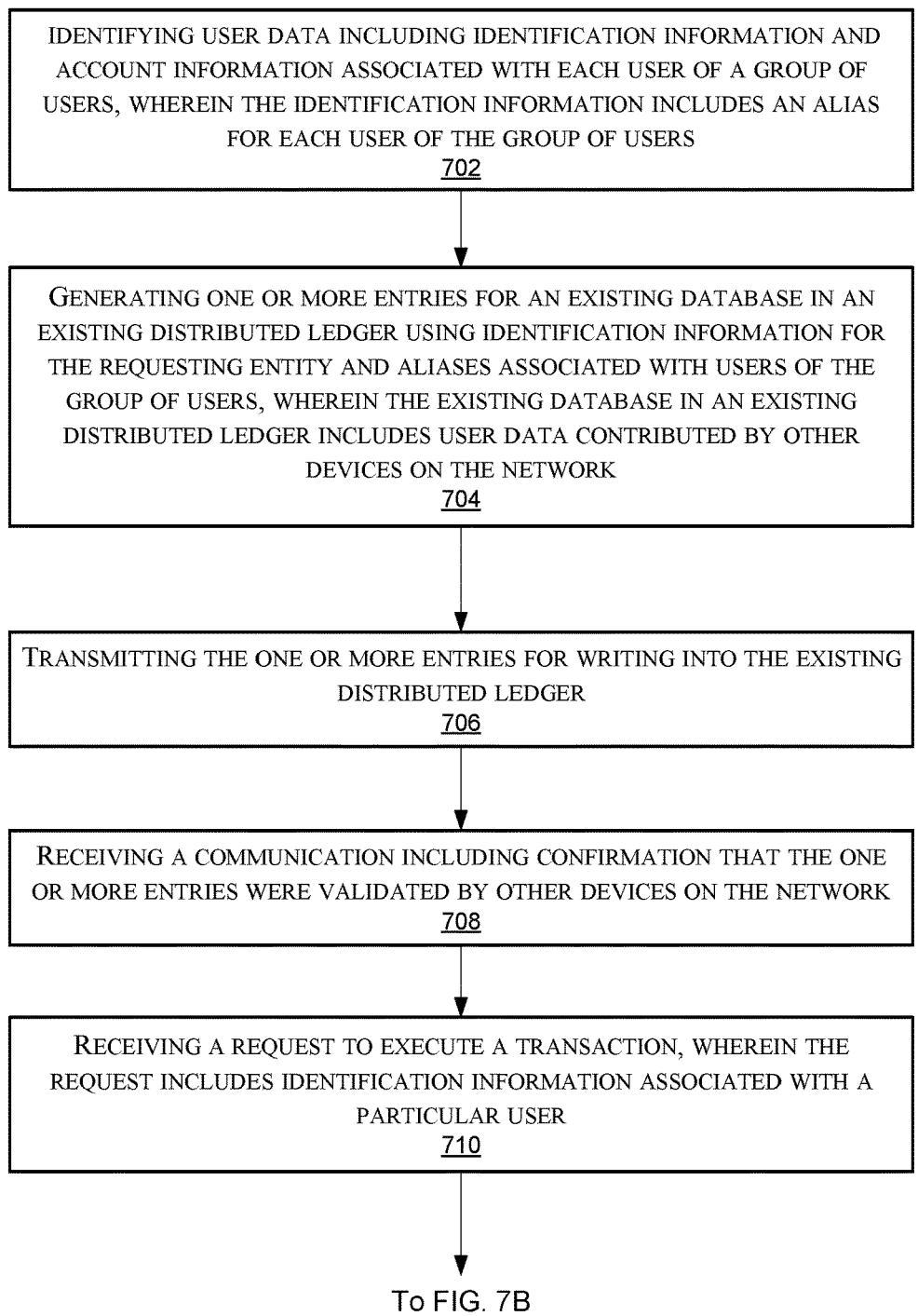
FIGS. 7A-7B illustrate a flow chart of an example process implementing example embodiments of the present technology.
Figure 7B:
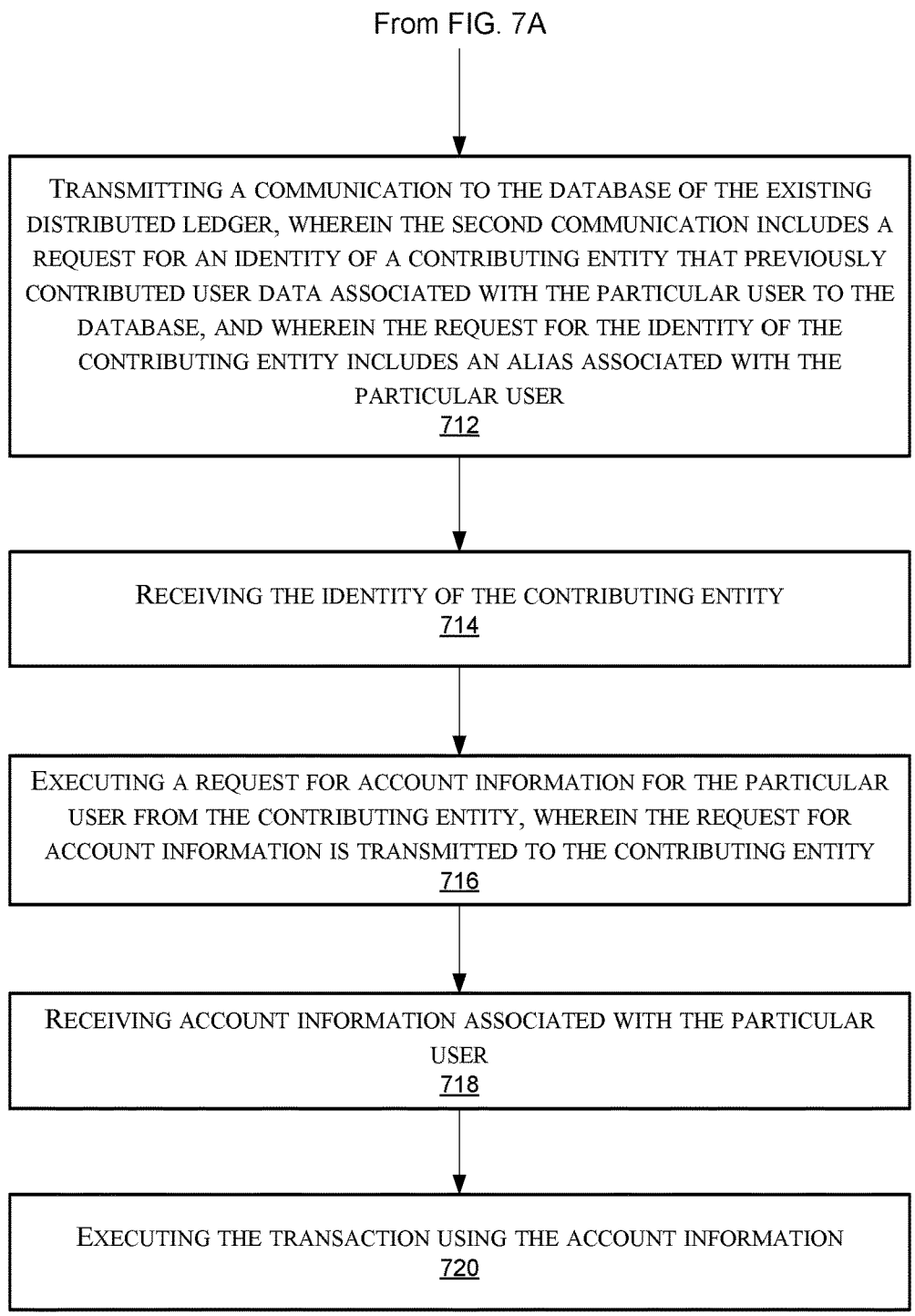

FIGS. 7A-7B illustrate a flow chart of an example process implementing example embodiments of the present technology. Step 702 may include identifying user data including identification information and account information associated with each user of a group of users, wherein the identification information includes an alias for each user of the group of users. Step 704 may include generating one or more entries for an existing database in an existing distributed ledger using identification information for the requesting entity and aliases associated with users of the group of users, wherein the existing database in an existing distributed ledger includes user data contributed by other devices on the network. Step 706 may include transmitting the one or more entries for writing into the existing distributed ledger. Step 708 may include receiving a communication including confirmation that the one or more entries were validated by other devices on the network. Step 710 may include receiving a request to execute a transaction, wherein the request includes identification information associated with a particular user. Step 712 may include transmitting a communication to the database of the existing distributed ledger, wherein the second communication includes a request for an identity of a contributing entity that previously contributed user data associated with the particular user to the database, and wherein the request for the identity of the contributing entity includes an alias associated with the particular user. Step 714 may include receiving the identity of the contributing entity. Step 716 may include executing a request for account information for the particular user from the contributing entity, wherein the request for account information is transmitted to the contributing entity. Step 718 may include receiving account information associated with the particular user. Step 7020 may include executing the transaction using the account information. These operations may be performed, for example, by the network device of the requesting entity.

Figure 8:
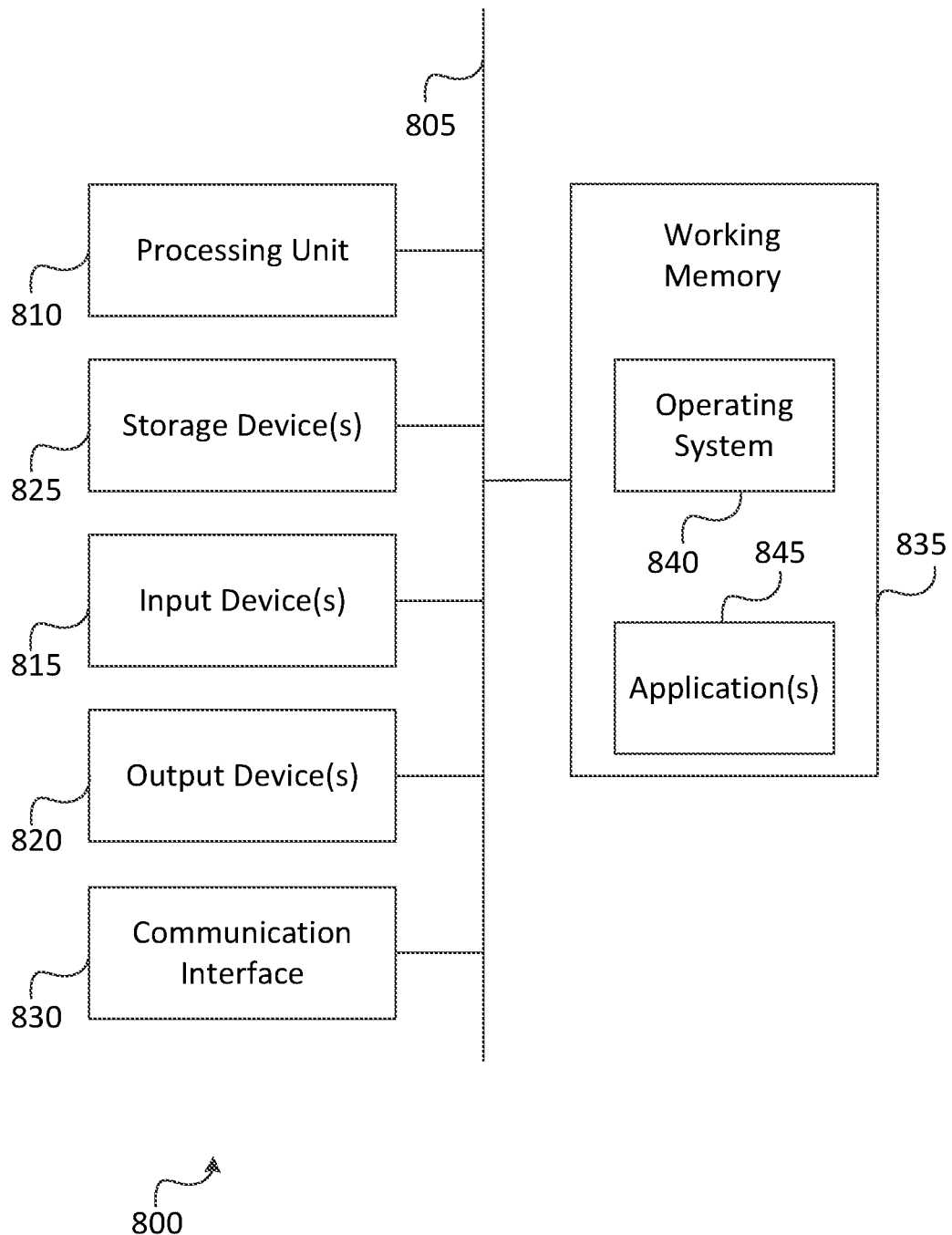
FIG. 8 provides a schematic illustration of one embodiment of a computer system, according to embodiments of the present technology.

An example computer system as illustrated in FIG. 8 may be incorporated as part of the previously described computerized devices. For example, computer system 800 can represent some of the components of system 100, and/or other computing devices as described herein. FIG. 8 provides a schematic illustration of one embodiment of a computer system 800 that can perform the methods provided by various other embodiments, as described herein, and/or can function as a server, provisioning system, requester device, rate provider device, point of sale device, mobile device, and/or other computer system. FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include a processing unit 810, including without limitation one or more processors programmed to perform particular functions, such as one or more special-purpose processors (such as digital signal processing chips, graphics acceleration processors, and/or the like); one or more input devices 815, which can include without limitation a mouse, a keyboard, a touchscreen, receiver, a motion sensor, a camera, a smartcard reader, a contactless media reader, and/or the like; and one or more output devices 820, which can include without limitation a display device, a speaker, a printer, a writing module, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, ledger or database structures, and/or the like.

The computer system 800 might also include a communication interface 830, which can include without limitation a modem, a network card (wireless or wired), an infrared communication device, a wireless communication device and/or chipset (such as a Bluetooth™ device, an 502.11 device, a Wi-Fi device, a WiMax device, an NFC device, cellular communication facilities, etc.), and/or similar communication interfaces. The communication interface 830 may permit data to be exchanged with a network (such as the network described below, to name one example), other computer systems, and/or any other devices described herein. In many embodiments, the computer system 800 will further comprise a non-transitory working memory 835, which can include a RAM and/or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a computer (or other device) to perform one or more operations in accordance with the described methods.

A set of these instructions and/or code might be stored on a computer-readable storage medium, such as the storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure and/or adapt a computer for a specific purpose using the instructions/code stored thereon. These instructions might take the form of executable code, which is executable by the computer system 800 and/or might take the form of source and/or installable code, which, upon compilation and/or installation on the computer system 800 (e.g., using any of a variety of compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system having specialized components. For example, a provisioning system configured to provide some or all of the features described herein relating to the provisioning of rates can comprise hardware and/or software that is specialized (e.g., an application-specific integrated circuit (ASIC), a software method, etc.) to carry out a specific function. Further, connection to other computing devices such as network input/output devices may be employed.

Some embodiments may employ a computer system (such as the computer system 800) to perform methods in accordance with the disclosure. For example, some or all of the procedures of the described methods may be performed by the computer system 800 in response to processing unit 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processing unit 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processing unit 810 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 825. Volatile media include, without limitation, dynamic memory, such as the working memory 835. Transmission media include, without limitation, coaxial cables, copper wire and fiber optics, including the wires that comprise the bus 805, as well as the various components of the communication interface 830 (and/or the media by which the communication interface 830 provides communication with other devices). Hence, transmission media can also take the form of waves (including without limitation radio, acoustic and/or light waves, such as those generated during radio-wave and infrared data communications).

The communication interface 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a non-transitory storage device 825 either before or after execution by the processing unit 810.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A system, comprising:
   one or more processors; and
   a memory having instructions stored thereon, which when executed by the one or more processors, cause the computing device to perform operations including:
   identifying, at a network device of a requesting entity on a network, user data including identification information and account information associated with each user of a group of users, wherein the identification information includes an alias for each user of the group of users;
   generating, at the network device of the requesting entity, one or more entries for an existing database in an existing distributed ledger using identification information for the requesting entity and aliases associated with users of the group of users, wherein the existing database in an existing distributed ledger includes user data contributed by other devices on the network;
   transmitting, from the network device of the requesting entity, the one or more entries for writing into the existing distributed ledger;
   receiving, at the network device of the requesting entity, a first communication including confirmation that the one or more entries were validated by other devices on the network;
   receiving, at the network device of the requesting entity, a first request to execute a transaction, wherein the first request includes identification information associated with a particular user;
   transmitting, by the network device of the requesting entity, a second communication to the database of the existing distributed ledger, wherein the second communication includes a second request for an identity of a contributing entity that previously contributed user data associated with the particular user to the existing database, and wherein the second request for the identity of the contributing entity includes an alias associated with the particular user;
   receiving, at the network device of the requesting entity, the identity of the contributing entity, wherein receiving the identity of the contributing entity comprises receiving a URL and a lookup API associated with the contributing entity in response to the second request;
   generating, by the network device of the requesting entity, a third request for account information for the particular user from the contributing entity, wherein the third request for account information is transmitted to the contributing entity; and wherein the third request is executed using the lookup API at the URL associated with the contributing entity;
   receiving, at the network device of the requesting entity, account information associated with the particular user from the contributing entity; and
   executing, at the network device of the requesting entity, the transaction using the account information.

2. The system of claim 1, wherein the operations further include:
   receiving, at the network device of the requesting entity, a third communication including a fourth request for user data associated with the group of users;
   receiving, at the network device of the requesting entity, the user data including identification information and account information associated with each user of the group of users; and
   filtering, at the network device of the requesting entity, the user data to exclude the account information associated with the group of users.

3. The system of claim 1, wherein the received account information is received in the form of a token, wherein the token is an encrypted version of the account information for particular user.

4. The system of claim 1, wherein the third request includes identification information associated with the particular user.

5. The system of claim 1, wherein the validation of the one or more entries by the other devices on the network further includes:
   receiving the one or more entries for the existing database;
   retrieving a previous hash associated with a previous entry in the existing database;
   generating a new hash using a hash algorithm using data incorporated into the one or more entries; and
   comparing the new hash with the previous hash.

6. The system of claim 1, wherein transmitting the one or more entries for writing into the existing database of the existing distributed ledger further includes executing a create function to add the one or more entries to a directory.

7. The system of claim 6, wherein the operations further include:
   determining that the requesting entity is no longer a trusted node in the network; and
   executing a delete function to delete the one or more entries from the existing database of the existing distributed ledger.

8. The system of claim 1, wherein the identity of the contributing entity further comprises at least one of a name of the contributing entity or an entity ID of the contributing entity, and wherein executing the third request further comprises authenticating, by the network device of the requesting entity, the contributing entity by confirming that the URL received from the contributing entity is served using a server certificate signed by a certificate authority of the existing distributed ledger.

9. A non-transitory computer-readable media comprising computer-readable instructions stored thereon that when executed by a processor cause the processor to perform operations including:
   identifying, at a network device of a requesting entity on a network, user data including identification information and account information associated with each user of a group of users, wherein the identification information includes an alias for each user of the group of users;
   generating, at the network device of the requesting entity, one or more entries for an existing database in an existing distributed ledger using identification information for the requesting entity and aliases associated with users of the group of users, wherein the existing database in an existing distributed ledger includes user data contributed by other devices on the network;
   transmitting, from the network device of the requesting entity, the one or more entries for writing into the existing distributed ledger;
   receiving, at the network device of the requesting entity, a first communication including confirmation that the one or more entries were validated by other devices on the network;
   receiving, at the network device of the requesting entity, a first request to execute a transaction, wherein the first request includes identification information associated with a particular user;
   transmitting, by the network device of the requesting entity, a second communication to the database of the existing distributed ledger, wherein the second communication includes a second request for an identity of a contributing entity that previously contributed user data associated with the particular user to the existing database, and wherein the second request for the identity of the contributing entity includes an alias associated with the particular user;
   receiving, at the network device of the requesting entity, the identity of the contributing entity wherein receiving the identity of the contributing entity comprises receiving a URL and a lookup API associated with the contributing entity in response to the second request;
   generating, by the network device of the requesting entity, a third request for account information for the particular user from the contributing entity, wherein the third request for account information is transmitted to the contributing entity; and wherein the third request is executed using the lookup API at the URL associated with the contributing entity;
   receiving, at the network device of the requesting entity, the account information associated with the particular user from the contributing entity; and
   executing, at the network device of the requesting entity, the transaction using the account information.

10. The non-transitory computer-readable media of claim 9, wherein the operations further include:
   receiving, at the network device of the requesting entity, a third communication including a fourth request for user data associated with the group of users;
   receiving, at the network device of a requesting entity, the user data including identification information and account information associated with each user of the group of users; and
   filtering, at the network device of the requesting entity, the user data to exclude the account information associated with the group of users.

11. The non-transitory computer-readable media of claim 9, wherein the account information is received in the form of a token, wherein the token is an encrypted version of the account information for the particular user.

12. The non-transitory computer-readable media of claim 9, wherein the third request includes identification information associated with the particular user.

13. The non-transitory computer-readable media of claim 9, wherein the validation of the one or more entries by the other devices on the network further includes:
   receiving the one or more entries for the existing database;
   retrieving a previous hash associated with a previous entry in the existing database;
   generating a new hash using a hash algorithm using data incorporated into the one or more entries; and
   comparing the new hash with the previous hash.

14. The non-transitory computer-readable media of claim 9, wherein transmitting the one or more entries for writing into the existing database of the existing distributed ledger further includes executing a create function to add the one or more entries to a directory.

15. The non-transitory computer-readable media of claim 14, wherein the operations further include:
   determining that the requesting entity is no longer a trusted node in the network; and
   executing a delete function to delete the one or more entries from the existing database of the existing distributed ledger.

16. The non-transitory computer-readable media of claim 9, wherein the identity of the contributing entity further comprises at least one of a name of the contributing entity or an entity ID of the contributing entity, and wherein executing the third request further comprises authenticating, by the network device of the requesting entity, the contributing entity by confirming that the URL received from the contributing entity is served using a server certificate signed by a certificate authority of the existing distributed ledger.

17. A computer-implemented method, the method comprising:
   identifying, at a network device of a requesting entity on a network, user data including identification information and account information associated with each user of a group of users, wherein the identification information includes an alias for each user of the group of users;
   generating, at the network device of the requesting entity, one or more entries for an existing database in an existing distributed ledger using identification information for the requesting entity and aliases associated with users of the group of users, wherein the existing database in an existing distributed ledger includes user data contributed by other devices on the network;
   transmitting, from the network device of the requesting entity, the one or more entries for writing into the existing distributed ledger;
   receiving, at the network device of the requesting entity, a first communication including confirmation that the one or more entries were validated by other devices on the network;
   receiving, at the network device of the requesting entity, a first request to execute a transaction, wherein the first request includes identification information associated with a particular user;

transmitting, by the network device of the requesting entity, a second communication to the database of the existing distributed ledger, wherein the second communication includes a second request for an identity of a contributing entity that previously contributed user data associated with the particular user to the database, and wherein the second request for the identity of the contributing entity includes an alias associated with the particular user;

receiving, at the network device of the requesting entity, the identity of the contributing entity, wherein receiving the identity of the contributing entity comprises receiving a URL and a lookup API associated with the contributing entity in response to the second request;

generating, by the network device of the requesting entity, a third request for account information for the particular user from the contributing entity, wherein the third request for account information is transmitted to the contributing entity; and wherein the third request is executed using the lookup API at the URL associated with the contributing entity;

receiving, at the network device of the requesting entity, the account information associated with the particular user from the contributing entity; and executing, at the network device of the requesting entity, the transaction using the account information.

18. The method of claim 17, further comprising:
receiving, at the network device of the requesting entity, a third communication including a fourth request for user data associated with the group of users;

receiving, at the network device of the requesting entity, the user data including identification information and account information associated with each user of the group of users; and filtering, at the network device of the requesting entity, the user data to exclude the account information associated with the group of users.

19. The method of claim 17, wherein the account information is received in the form of a token, wherein the token is an encrypted version of the account information for the particular user.

20. The method of claim 17, wherein the third request includes identification information associated with the particular user.

21. The method of claim 17, wherein the identity of the contributing entity further comprises at least one of a name of the contributing entity or an entity ID of the contributing entity, and wherein executing the third request further comprises authenticating, by the network device of the requesting entity, the contributing entity by confirming that the URL received from the contributing entity is served using a server certificate signed by a certificate authority of the existing distributed ledger.

* * * * *